(12) United States Patent
Banerjee et al.

(10) Patent No.: US 7,870,130 B2
(45) Date of Patent: Jan. 11, 2011

(54) TECHNIQUES FOR IDENTIFYING A MATCHING SEARCH TERM IN AN IMAGE OF AN ELECTRONIC DOCUMENT

(75) Inventors: Dwip N. Banerjee, Austin, TX (US);
Ranadip Das, West Bengal (IN);
Sandeep R. Patil, Maharashtra (IN);
Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/867,722

(22) Filed: Oct. 5, 2007

(65) Prior Publication Data

US 2009/0094238 A1    Apr. 9, 2009

(51) Int. Cl.
*G06F 17/30* (2006.01)
(52) U.S. Cl. .................. 707/729; 707/805; 707/918; 345/619; 715/233
(58) Field of Classification Search .............. 707/3–5, 707/104.1, 713, 802, 913, 729, 805, 918, 707/999.003, 999.102; 345/619; 715/233, 715/234
See application file for complete search history.

(56) References Cited

U.S. PATENT DOCUMENTS

| | | | |
|---|---|---|---|
| 6,272,488 B1 | 8/2001 | Chang et al. | |
| 6,944,611 B2 | 9/2005 | Flank et al. | |
| 7,043,474 B2 | 5/2006 | Mojsilovic et al. | |
| 7,177,879 B2 | 2/2007 | Flank et al. | |
| 2005/0246623 A1 | 11/2005 | Ma et al. | |
| 2006/0158533 A1 | 7/2006 | Brahmbhatt et al. | |
| 2008/0082426 A1* | 4/2008 | Gokturk et al. | 705/27 |
| 2008/0235184 A1* | 9/2008 | Nakamura | 707/3 |

OTHER PUBLICATIONS

Cunningham, SJ et al. "Looking for a Picture: An Analysis of Everyday Image Information Searching" JCDL '06, pp. 198-199, Jun. 11-15, 2006.
Anagnostopoulos, A et al. "Sampling Search-Engine Results" WWW 2005, pp. 245-256, May 10-14, 2005.
Joshi, D et al. "The Story Picturing Engine—A System for Automatic Text Illustration" ACM Transactions on Multimedia Computing, Communications and Applications, vol. 2, No. 1 pp. 68-89, Feb. 2006.
Chun, B. et al, "Region-specific Metadata Enhancement for Images" pp. 1-7, http://www.media.mit.edu/pia/Research/deepview/deepview.doc.

* cited by examiner

*Primary Examiner*—Cheryl Lewis
(74) *Attorney, Agent, or Firm*—Dillon & Yudell LLP

(57) ABSTRACT

A technique for facilitating identification of a matching search term in one or more images includes selecting at least a portion of an image and creating search enriched metadata for a document that includes the image. The search enriched metadata includes a text portion that provides one or more search terms that are associated with the selected portion of the image and a location portion that provides a location of the selected portion of the image.

18 Claims, 7 Drawing Sheets

TECHNIQUES FOR IDENTIFYING A MATCHING SEARCH TERM IN AN IMAGE OF AN ELECTRONIC DOCUMENT

BACKGROUND

1. Field

This disclosure relates generally to electronic documents and, more specifically, to techniques for identifying a matching search term in an image of an electronic document.

2. Related Art

Metalogging refers to the process of adding descriptive information (metadata) about an electronic document, e.g., a file including a digital image, and storing the information in such a way that the information can be used to retrieve the document from, for example, a database. Metadata is typically embedded (stored inside a header) in a document in various fields. Various applications have been configured to search metadata to locate documents that correspond to a particular search term. Electronic images have been created in a number of different manners (e.g., by an application, a digital camera, or via scanning) and take various forms (e.g., digital photographs, flowcharts, and diagrams). Today, the information technology (IT) industry is increasingly challenged to electronically comprehend documents that include images. For example, it has been estimated that approximately fifty percent of electronic documents (e.g., files having the file extensions .html, .doc, .pdf, .lwp, .rtf, etc.) contain images.

In general, commercially available document editor/viewer applications, such as Microsoft Word, Open Office, Lotus SmartSuite™, Internet Explore (IE), Mozilla Application Suite, etc., provide a user with a search functionality (popularly known as "Find" or "Find/Replace") that allows the user to search text of an opened document for a search term (e.g., a word/phrase) which, when found, has been highlighted (by the application) within the document text with a selected color. However, known document editor/viewer applications do not highlight a search term that is included in a document image, even when the document image includes content that exactly matches the search term. That is, known document search algorithms ignore document images and only search document text for a user entered search term. Unfortunately, documents frequently include images that have content that matches a user entered search term and, as such, may be of interest to a user. While some search algorithms have searched metadata associated with images, image metadata has generally only included information (such as image resolution, image description, author, etc.) that has been used to assist a user in locating images of potential interest that are stored on, for example, personal computers (PCs) or servers coupled to the World Wide Web.

With reference to FIG. 1, an example screen dump 100 is provided to illustrate operation of a conventional document editor/viewer application. As is illustrated in the screen dump 100, a user has opened a sample document 102 that includes both text 104 and images 106 and 108. In the sample document 102, the document text 104 and the document image 108 both contain the search term "computer" and the document image 106 includes an image of a computer. In conventional document editor/viewer applications, the user may utilize an editor search facility associated with window 110 to find and highlight the search term "computer" in the document text 104. However, conventional document editor/viewer applications have not highlighted matching search terms within the document image 108, even when the document image 108 has contained information that corresponds to the search term.

Moreover, conventional document editor/viewer applications have not highlighted images (in this case, the computer system image 106) within the document 102 that correspond to the search term. As conventional document editor/viewer applications have not identified a search term included as content of a document image, images with content of interest may not be located by a user of a conventional document editor/viewer application.

SUMMARY

According to one aspect of the present disclosure, a technique for facilitating identification of a matching search term in one or more images includes selecting at least a portion of an image and creating search enriched metadata for a document that includes the image. The search enriched metadata includes a text portion that provides one or more search terms that are associated with the selected portion of the image and a location portion that provides a location of the selected portion of the image.

According to another aspect of the present disclosure, a technique for identifying an image in an electronic document includes determining whether a search term matches a text portion of search enriched metadata that is associated with the electronic document. The search enriched metadata also includes a location portion that is associated with the text portion. At least a portion of an image within the document is visually identified based on the location portion, when the text portion matches the search term.

According to one embodiment of the present disclosure, a computer system includes a memory subsystem and a processor that is coupled to the memory subsystem. The memory subsystem stores code that when executed by the processor causes the processor to receive input that corresponds to a selected portion of an image and create search enriched metadata for a document that includes the image. The search enriched metadata includes a text portion that provides one or more search terms that are associated with the selected portion of the image and a location portion that provides a location of the selected portion of the image.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
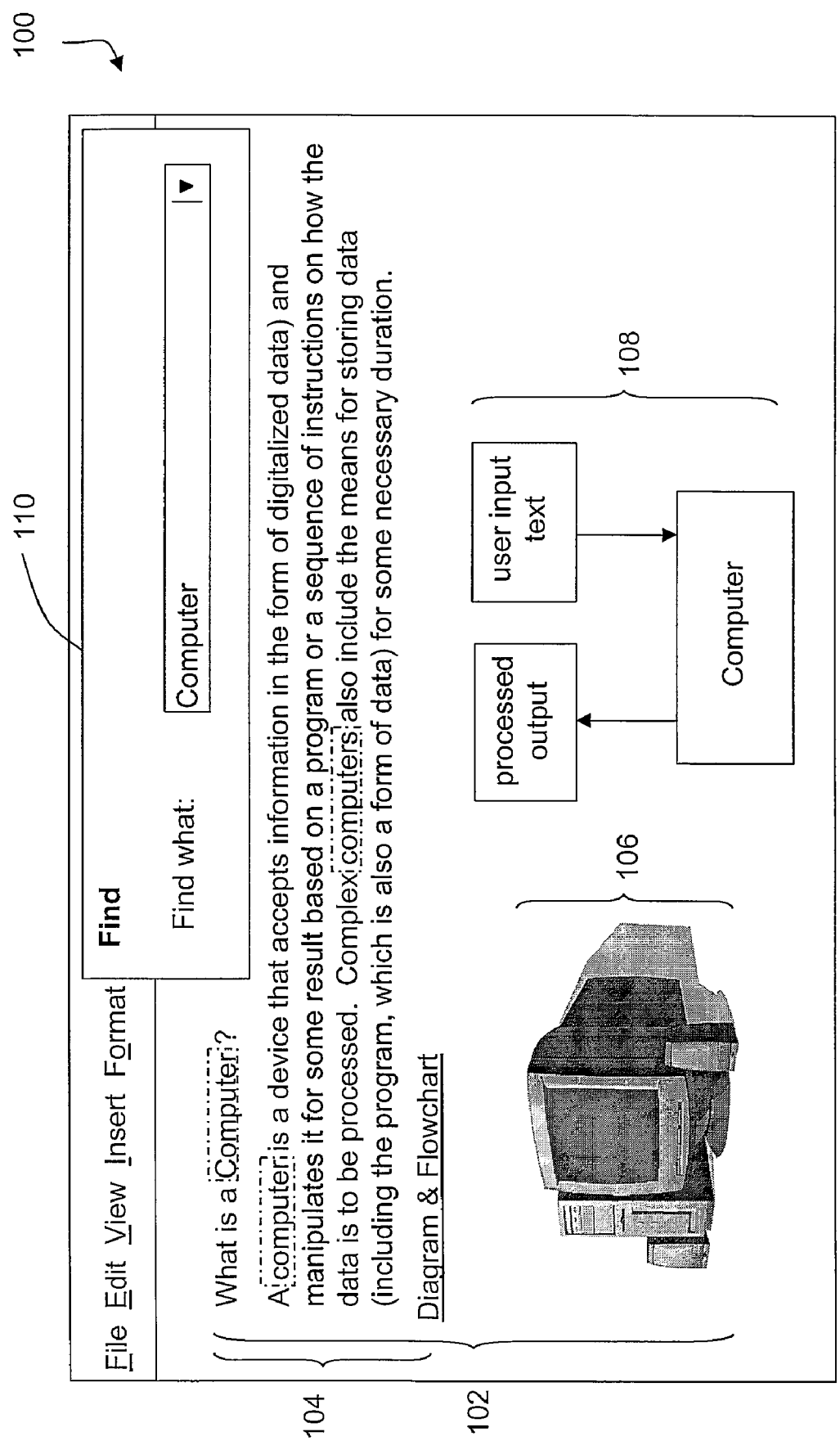
FIG. 1 is a screen dump of an example conventional document editor/viewer application that is not configured to identify a search term in a document image.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single computer, on multiple computers that may be remote from each other, or as a stand-alone software package. When multiple computers are employed, one computer may be connected to another computer through a local area network (LAN) or a wide area network (WAN), or the connection may be, for example, through the Internet using an Internet service provider (ISP).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. As used herein, the term "coupled" includes both a direct electrical connection between blocks or components and an indirect electrical connection between blocks or components achieved using intervening blocks or components.

Techniques according to the present disclosure allow an application user to identify a search term in an image of an electronic document. The techniques disclosed herein provide an application user with search results for an electronic document that includes one or more images, as well as an electronic document that includes one or more images and text. According to various aspects of the present disclosure, search terms are identified, e.g., highlighted, in both document text (if applicable) and document images. The disclosed techniques associate metadata (that includes user entered text) with user selected locations (e.g., in pixel coordinates) within an image. According to various aspects of the present disclosure, a searching algorithm that is typically used in text searching within documents may be modified to search image metadata (i.e., a user entered text portion of the metadata) for all images included in a document during a text search of the document. When a search hit occurs within the metadata, the search facility reads associated location information, e.g., pixel coordinates, from the metadata and identifies (e.g., highlights) an associated portion of the image. For example, an associated portion of the image may be highlighted with a predefined color that indicates a search hit.

The techniques disclosed herein may be divided into a search enriched metadata creation stage and a search algorithm enhancement stage. In the search enriched metadata creation stage, an image included in a document is enhanced by adding search enriched metadata to a header of the document or the image. Typically, an image includes a header followed by pixel content (i.e., in the form <header> <actual image>). According to various embodiments of the present disclosure, a new document format is introduced that includes a traditional header, followed by search enriched metadata header, which is followed by pixel content (i.e., <traditional header> <search enriched metadata header> <actual image>). In one embodiment, location metadata is created by a document editor/viewer application (based on a user selection) and text metadata is created from input provided to the application from a user. The search enriched metadata (i.e., the location metadata and the text metadata) is then stored in a header of the document or the image. In general, a document editor/viewer application is configured to: allow a user to select (e.g., using a mouse) a desired portion of a displayed image and note start and end pixel coordinates of the selection, prompt the user to enter text representing the user selection; save coordinates of the selection along with the associated user entered text in the search enriched metadata of the document (e.g., [{upper left location, upper right location, lower left location, lower right location, user entered text}]; and repeat the above-described process until a user saves and exits the document editor/viewer application.

According to another embodiment of the present disclosure, a document editor/viewer application is enhanced to recognize the new document format disclosed above. When a user selects a document search facility of the application, the application determines whether an opened document contains images with search enriched metadata. When the application searches for a user entered search term (e.g., word/phrase) in the document, the application searches document text as well as any search enriched metadata included in the document. On encountering a document (e.g., an image document or a document including one or more images and text) with search enriched metadata, the application reads the search enriched metadata of the document. The application parses the search enriched metadata and searches for a user entered search term in one or more user entered text fields of the metadata. When a match is found, the application reads the position coordinates associated with the user entered text field and identifies that portion of the image (e.g., highlights that portion of the image with a predefined color, a box, etc. indicating a search hit). The application then continues the above-described process for all images in the document until the end of the document is reached.

Figure 2:
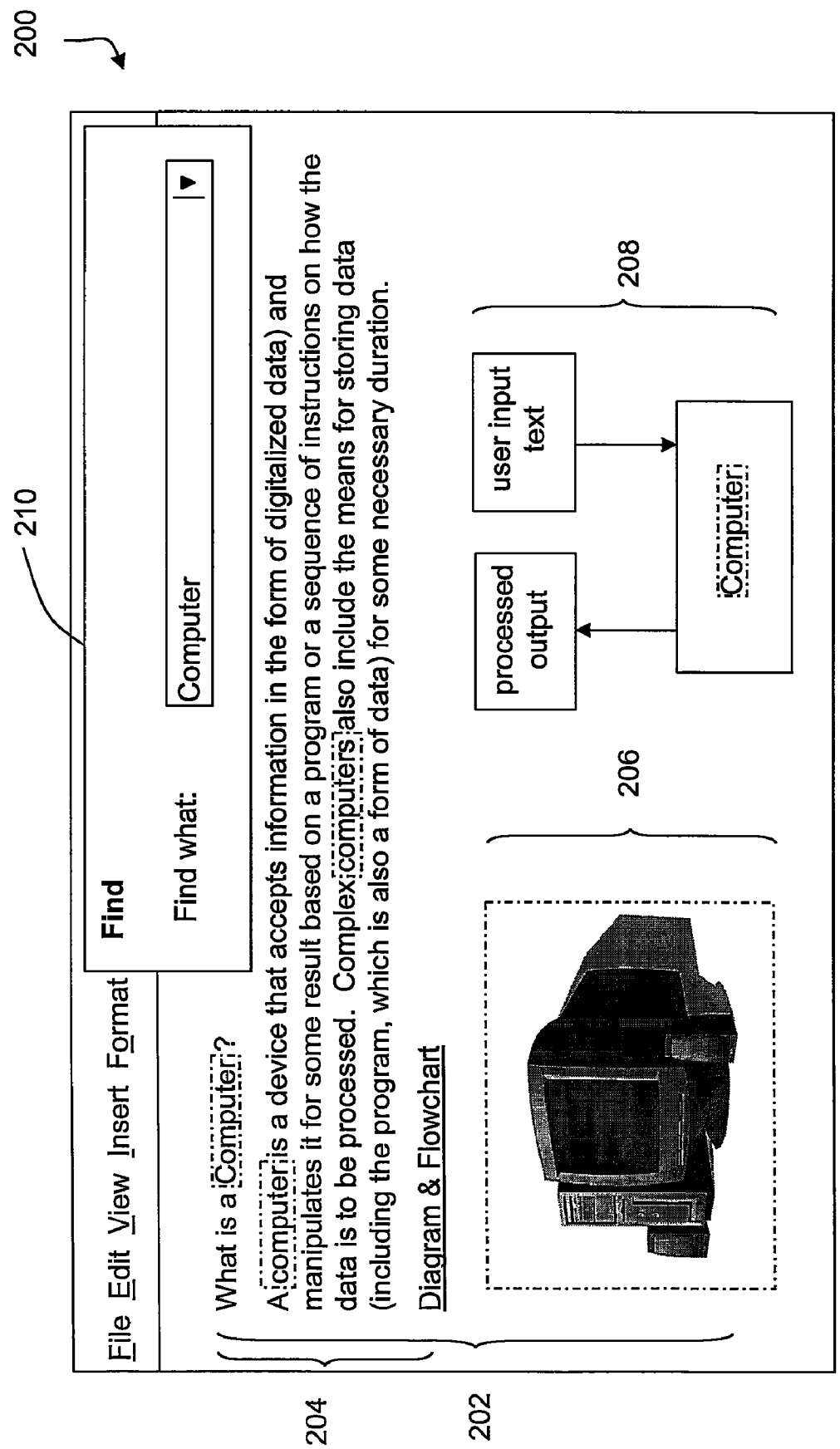
FIG. 2 is an example screen dump of a document editor/viewer application, configured according to the present disclosure, that identifies a search term in text and images of a document.

With reference to FIG. 2, an example screen dump 200 provided by a document editor/viewer application, configured according to one or more disclosed embodiment, is illustrated. As is depicted, a user, using the application, has opened a sample document 202 that includes both text 204 and images 206 and 208. In the sample document 202, the document text 204 and the document image 208 both contain the search term "computer" and the document image 206 includes an image of a computer. In the application 200, a user may utilize an editor search facility associated with window 210 to find and highlight the search term "computer" in the document text 204, matching search terms within the document image 208, as well as images (in this case, the computer system image 206) within the document 202. As the application identifies a search term included as content of a document image, images with content of interest may be readily located by a user of the application.

Figure 3:
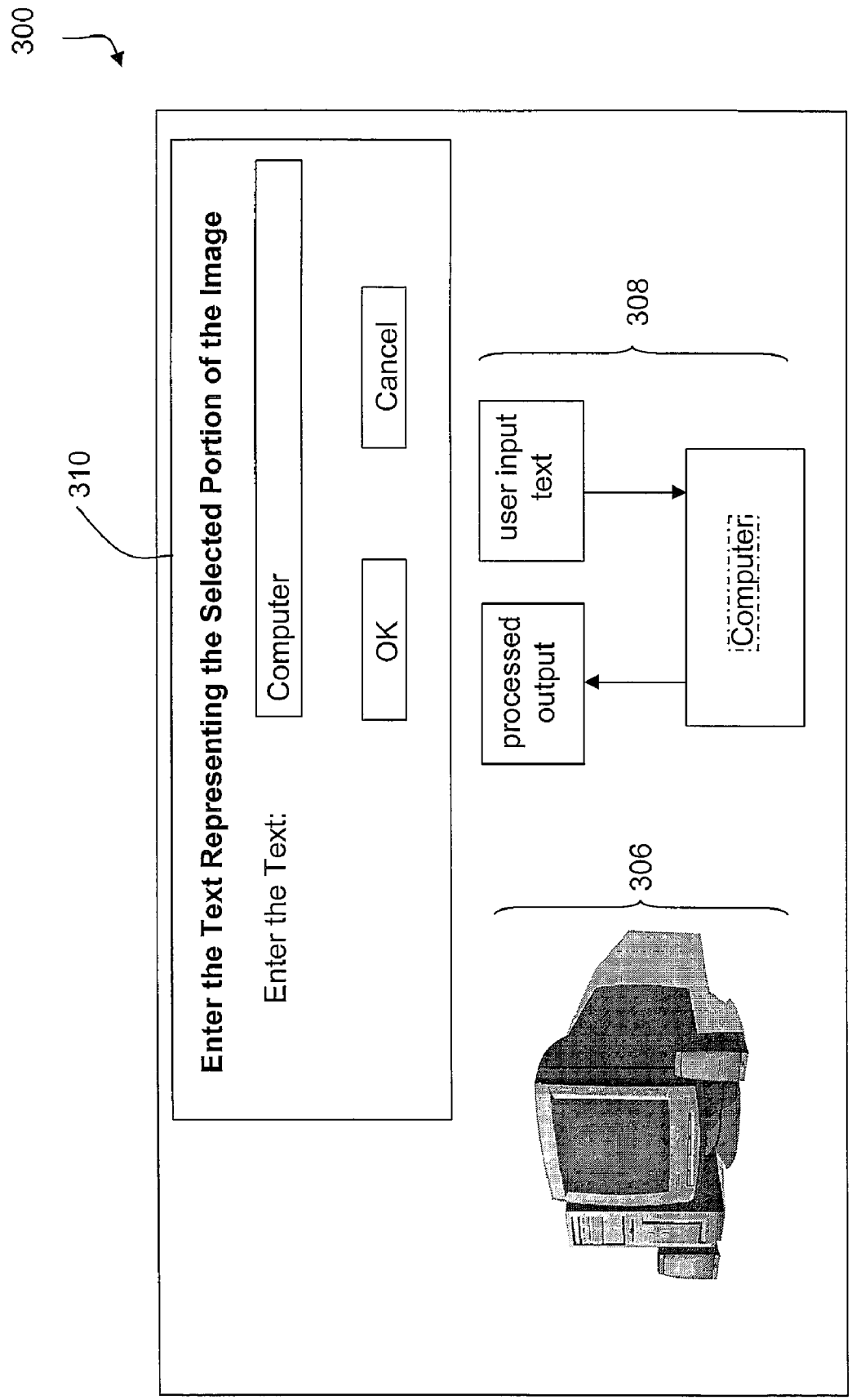
FIG. 3 is an example screen dump of a document editor/viewer application, configured according to the present disclosure, that creates metadata that provides a written description of content of interest in a document image and positional coordinates within the document image for the content of interest.

With reference to FIG. 3, another example screen dump 300 that is associated with a document editor/viewer application, configured according to various aspects of the present disclosure, is depicted. The application allows a user to enter text that represents a selected portion of an image 308. As is illustrated, the user has selected (using, for example, a mouse) the term "computer" in the image 308 and has entered the search term "computer" into an input box of window 310 of the application. Responsive to the user selecting a portion of the image 308, entering a search term into the input box of the window 310, and selecting the "OK" button, the application creates associated search enriched metadata for the portion of the image 308.

Figure 4:
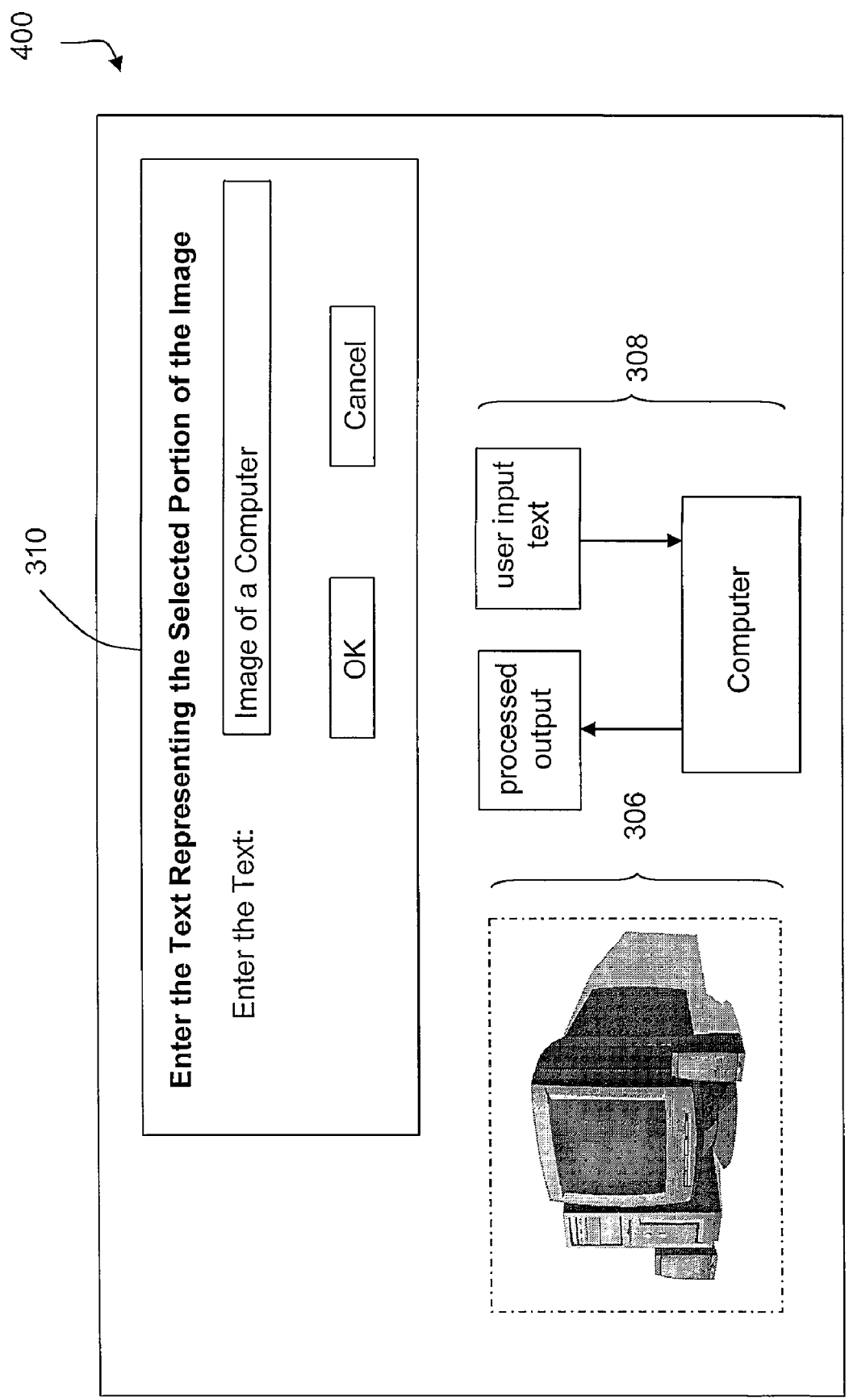
FIG. 4 is another example screen dump provided by the application associated with FIG. 3.

With reference to FIG. 4, another example screen dump 400 that is also associated with the application of FIG. 3 is depicted. The application allows a user to enter text that represents a selected image 306. As is illustrated, the user has selected the image 306, which corresponds to a computer, and has entered the search term "image of a computer" into an input box of window 310 of the application. Responsive to the user selecting the image 306, entering a search term into the input box of the window 310, and selecting the "OK" button, the application creates associated search enriched metadata for the image 306.

Figure 5:
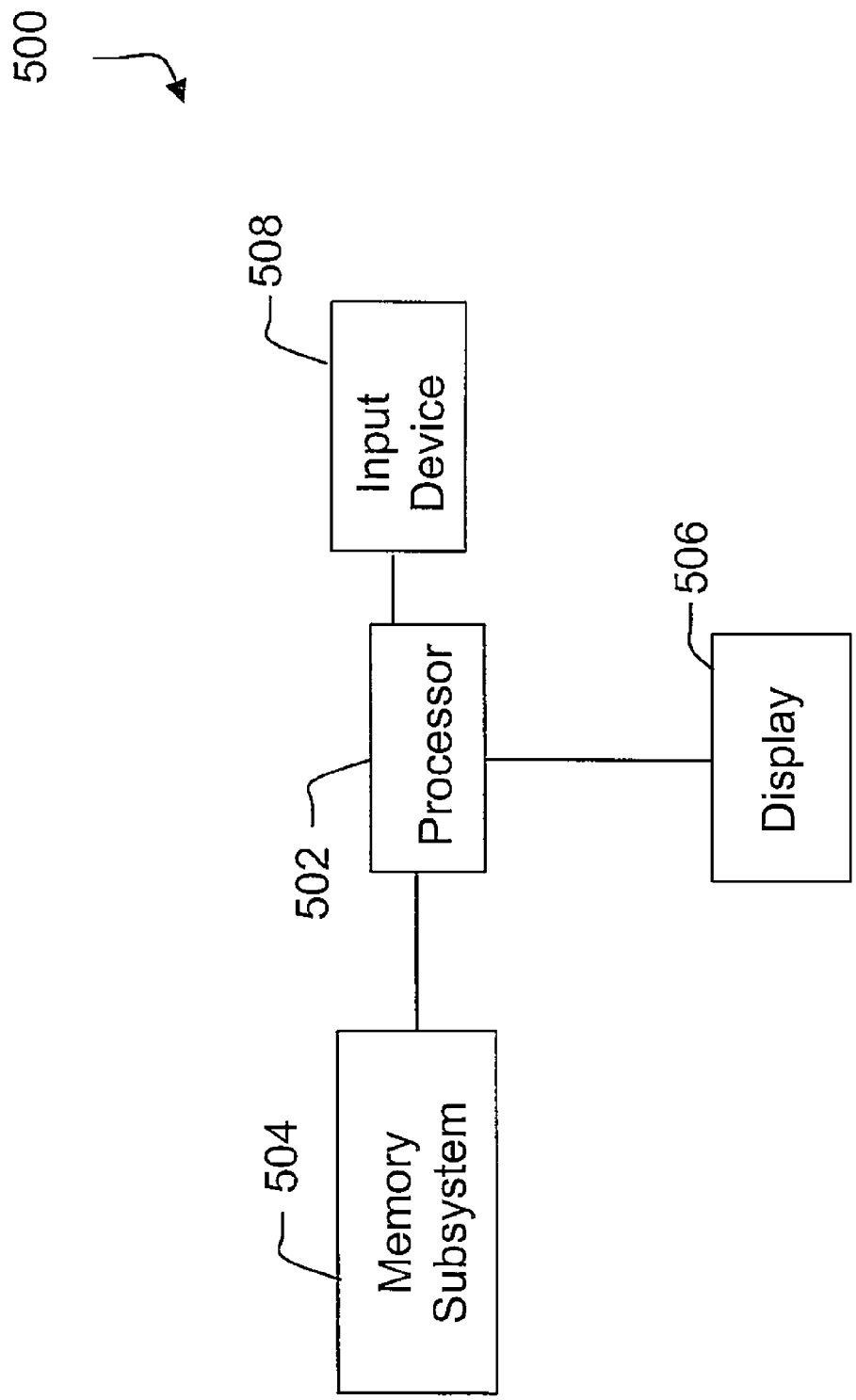
FIG. 5 is a block diagram of an example computer system that may be configured to execute the application associated with the screen dump of FIG. 3.

With reference to FIG. 5, an example computer system 500 is illustrated that may be configured to execute a document editor/viewer application that facilitates identification of a search term in an image using search enriched metadata, configured according to various embodiments of the present disclosure. The computer system 500 may be utilized, for example, by a user that is attempting to comprehend images within a number of different documents. The computer system 500 includes a processor 502 that is coupled to a memory subsystem 504, a display 506, and an input device 508. The memory subsystem 504 normally includes an application appropriate amount of volatile memory (e.g., dynamic random access memory (DRAM)) and non-volatile memory (e.g., read-only memory (ROM)). The display 506 may be, for example, a cathode ray tube (CRT) or a liquid crystal display (LCD). The input device 508 may include, for example, a mouse, a touch screen or graphics tablet (where a stylus or a finger of a user provides the input), and a keyboard. The processor 502 may also be coupled to one or more mass storage devices, e.g., a compact disc read-only memory (CD-ROM) drive.

Figure 6:
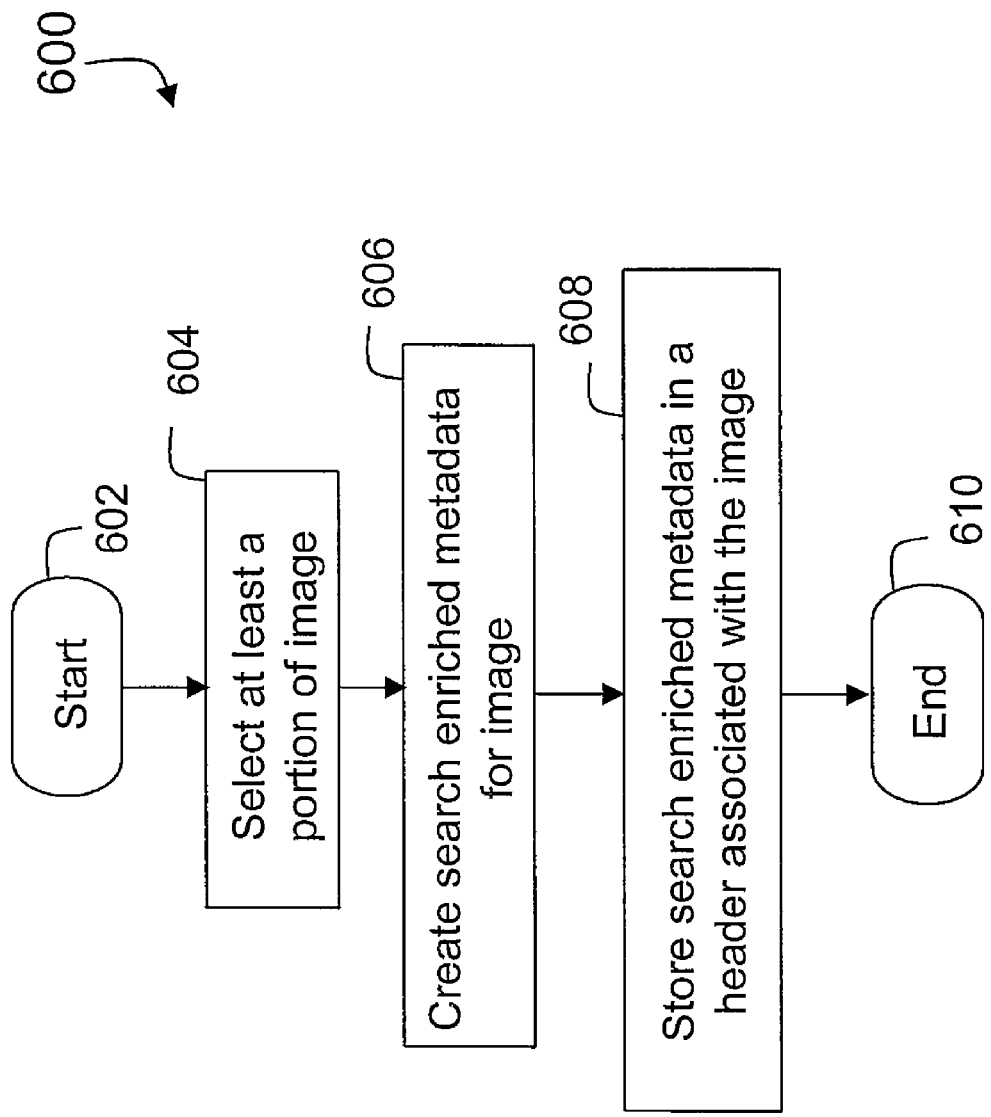
FIG. 6 is a flowchart of a process for creating search enriched metadata for a document that includes an image, according to an embodiment of the present disclosure.

With reference to FIG. 6, an example search enriched metadata creation process 600 for creating search enriched metadata, according to various aspects of the present disclosure, is illustrated. In block 602, the process 600 is initiated at which point control transfers to block 604. In block 604, a user selects (using, for example, a mouse) at least a portion of an image for which the user wishes to create search enriched metadata. Next, in block 606, the application creates the search enriched metadata, which includes a text portion (i.e., corresponding to a user entered term) and a location portion (e.g., pixel coordinates), which corresponds to the user selection. Then, in block 608, the search enriched metadata is stored in a header associated with the document or the image. The header may be stored in the image, in the same document as the image, or in a different file that is associated with the image. Following block 608, control transfers to block 610 where the process 600 terminates based on, for example, a user electing to terminate the search enriched metadata creation process.

Figure 7:
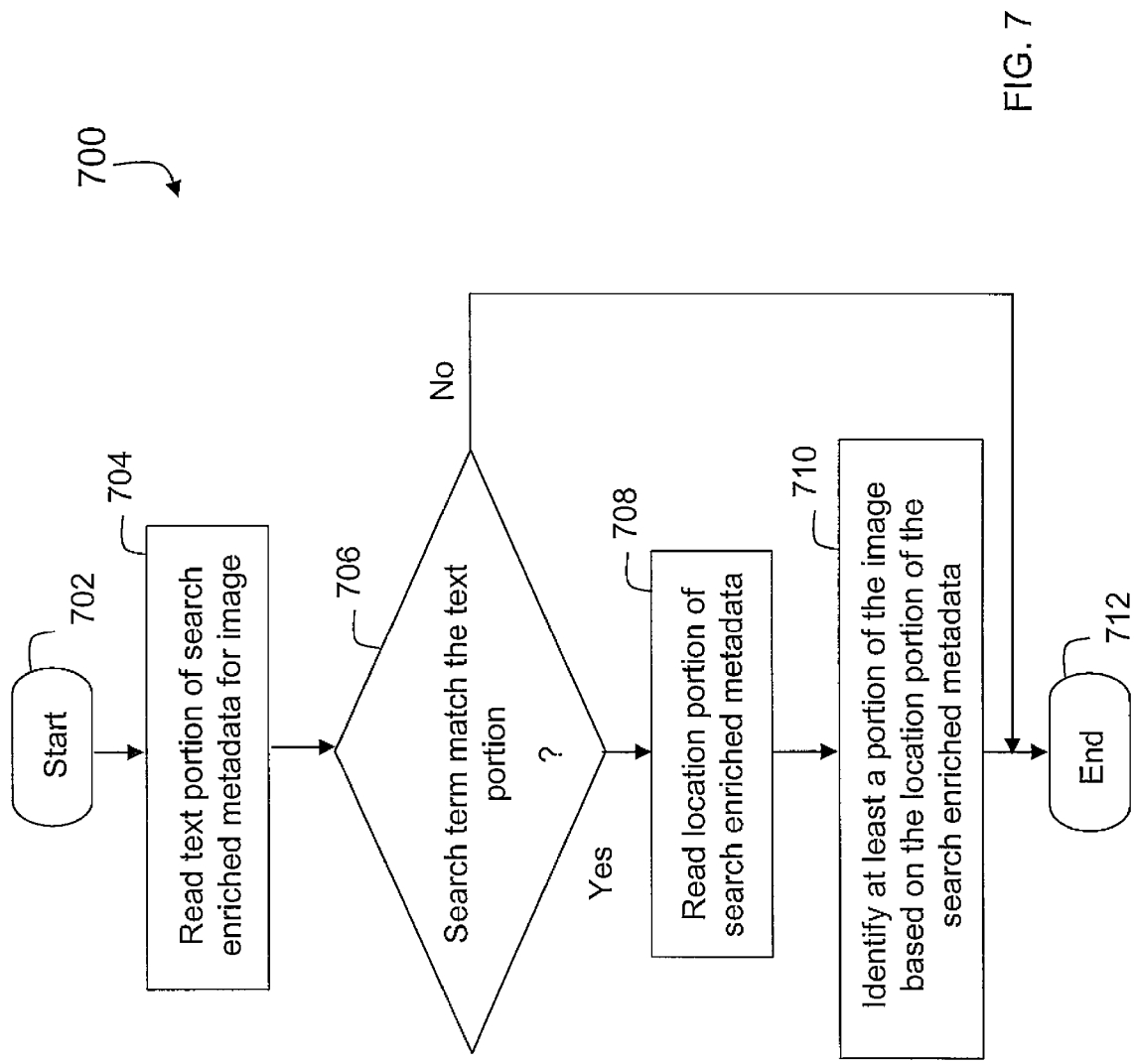
FIG. 7 is a flowchart of a process for visually identifying at least a portion of an image within a document based on a location portion of search enriched metadata, according to another embodiment of the present disclosure.

With reference to FIG. 7, an example image search process 700 for identifying image content based on search enriched metadata, according to various aspects of the present disclosure, is illustrated. In block 702, the process 700 is initiated at which point control transfers to block 704. In block 704, one or more text portions of search enriched metadata of a document are read. Next, in decision block 706, the application determines whether an entered search term matches one of the one or more text portions that were read. If the entered search term matches one of the one or more text portions, control transfers from block 706 to block 708. If the entered search term does not match one of the one or more text portions that were read, control transfers from block 706 to block 712. In block 708, the application reads a location portion of the search enriched metadata that corresponds to the matched search term. Then, in block 710, the process 700 identifies (e.g., highlights with a selected color, places a box around an appropriate portion of the image, etc.) at least a portion of an image within the document, based on the location portion of the search enriched metadata. Following block 710, control transfers to block 712 where the process 700 terminates based on, for example, a user electing to terminate the image search process.

Accordingly, techniques have been disclosed herein that readily allow a user to identify a search term in an image using search enriched metadata that is associated with the image.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of facilitating identification of a matching search term in one or more images within a document, comprising:
   displaying a document on a display;
   selecting at least a portion of an image that is included within the document;
   receiving, via an input device, location coordinates for the selected portion of the image, wherein the location coordinates provide a location portion that identifies a location of the selected portion of the image within the document; and
   creating search enriched metadata for the document, wherein the search enriched metadata includes a text portion that provides one or more search terms that are associated with the selected portion of the image and the location portion.

2. The method of claim 1, wherein the location coordinates are pixel coordinates.

3. The method of claim 1, wherein the input device is a mouse.

4. The method of claim 1, further comprising:
   storing the search enriched metadata in a header that is associated with the document or the image.

5. The method of claim 1, further comprising:
   storing the search enriched metadata in a header that is part of the document or the image.

6. The method of claim 1, wherein the document also includes text.

7. A method of identifying an image in an electronic document, comprising:
   determining whether a search term matches a text portion of search enriched metadata that is associated with the electronic document, the search enriched metadata also including a location portion that is associated with the text portion, wherein the location portion includes location coordinates, received from an input device, that identify a location of at least a portion of an image within the electronic document;
   reading the location portion from a header associated with the electronic document or the image when the text portion matches the search term; and
   visually identifying the at least a portion of an image within the document based on the location portion when the text portion matches the search term.

8. The method of claim 7, further comprising:
   reading the text portion from the header associated with the document or the image.

9. The method of claim 7, wherein the location portion includes pixel coordinates.

10. The method of claim 7, wherein the document also includes text.

11. The method of claim 7, wherein the visually identifying further comprises:
    highlighting, with a selected color, the image based on the location portion when the text portion matches the search term.

12. A method of claim 11, wherein the selected color is a user selected color.

13. A computer system, comprising:
    a memory subsystem; and
    a processor coupled to the memory subsystem, wherein the memory subsystem stores code that when executed by the processor causes the processor to:
        receive input that corresponds to a selected portion of an image that is included within a document, wherein the input includes location coordinates for the selected portion of the image in the document, and wherein the location coordinates provide a location portion that identifies a location of the selected portion of the image within the document; and
        create search enriched metadata for the document, wherein the search enriched metadata includes a text portion that provides one or more search terms that are associated with the selected portion of the image and the location portion.

14. The computer system of claim 13, wherein the location portion includes pixel coordinates.

15. The computer system claim 13, wherein the memory subsystem stores additional code that when executed by the processor causes to processor to:

store the search enriched metadata in a header that is associated with or part of the document or the image.

16. The computer system of claim 13, wherein the document also includes text.

17. The computer system claim 13, wherein the memory subsystem stores additional code that when executed by the processor causes to processor to:

determine whether an entered search term matches the text portion of the search enriched metadata; and identify the selected portion of the image within the document based on the location portion when the text portion matches the entered search term.

18. The computer system claim 13, wherein the memory subsystem stores additional code that when executed by the processor causes to processor to:

highlight, with a selected color, the selected portion of the image based on the location portion when the text portion matches the search term.

* * * * *